Patented Oct. 27, 1936

2,058,615

UNITED STATES PATENT OFFICE 2,058,615

AGE RESISTING VULCANIZED RUBBER AND ANTIOXIDANT AGENT

Harold A. Morton, Akron, Ohio

No Drawing. Application June 30, 1928,
Serial No. 289,629

18 Claims. (Cl. 18—50)

My invention relates to rubber or rubber-like compounds in a vulcanized condition, and more particularly to those having incorporated therein, or applied thereto, an anti-oxidant agent possessing little, if any, accelerating property, whereby the aging quality of the compound is materially enhanced.

I have discovered that certain 1-2 diamino ethane derivatives which do not possess material accelerating property, when incorporated in a rubber or rubber-like compound prior to the vulcanization thereof, or when applied to a vulcanized article, materially retard deterioration due to oxidation.

There are a great number of such aromatic amino derivatives of ethane which function in this manner, and in general they may be represented by the following general chemical constitution:

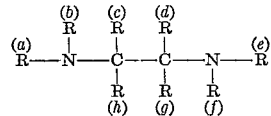

In the above representation of the constitutional formula, the chemical radicals attached to the nitrogen atoms are denoted by symbols, R(a), R(b), R(e), and R(f); the radicals attached to the carbon atoms are represented by R(c), R(d), R(g), and R(h).

R(a), R(b), and R(e), and R(f) may be any of the following chemical groups, or their equivalents: H, CH$_3$, CH$_3$CH$_2$, CH$_3$CH$_2$CH$_2$, (CH$_3$)$_2$CH, CH$_3$CH$_2$CH$_2$CH$_2$, (CH$_3$)$_2$CH.CH$_2$, CH$_3$CH$_2$CH$_2$CH$_2$CH$_2$, (CH$_3$)$_2$CH.CH$_2$CH$_2$, C$_6$H$_5$, C$_6$H$_4$.CH$_3$, C$_6$H$_3$(CH$_3$)$_2$, C$_6$H$_5$CH$_2$; C$_6$H$_4$NH$_2$, C$_6$H$_3$(CH$_3$)NH$_2$, C$_6$H$_4$OH, C$_{10}$H$_7$; but at least one of the radicals attached to each nitrogen atom should be aromatic in nature.

R(a), R(b), R(e), and R(f) may also be any of the following chemical groups, or their equivalents: NO, C$_6$H$_3$(CH$_3$)NO$_2$, C$_6$H$_4$NO$_2$, C$_6$H$_4$Cl; but in the case of these more negative groups, not more than two should be used in each molecule. Hereinafter when the term "hydrocarbon residues" is used, it is to be taken as including monosubstituted hydrocarbon residues.

R(c), R(d), R(g), and R(h) may be any of the following chemical radicals, or their equivalents: H, CH$_3$, CH$_3$CH$_2$, CH$_3$CH$_2$CH$_2$, (CH$_3$)$_2$CH, CH$_3$CH$_2$CH$_2$CH$_2$, (CH$_3$)$_2$CH.CH$_2$, CH$_3$CH$_2$CH$_2$CH$_2$CH$_2$, (CH$_3$)$_2$CH.CH$_2$CH$_2$, C$_6$H$_5$, C$_6$H$_4$CH$_3$, C$_6$H$_3$(CH$_3$)$_2$, C$_{10}$H$_7$, C$_6$H$_5$CH$_2$.

In this specification all of the materials referred to are nitrogen derivatives of ethane. In general they may be prepared by heating the dihalogen derivative of ethane (or substituted ethanes) with the appropriate aromatic amino compound, although other methods of preparation may be employed.

By the term derivative, as used in this specification and claims, it is not intended to include molecular constitutions containing several strongly negative groups as pointed out above, nor do I intend to include molecular constitutions containing still more highly negative groups such as C$_6$H$_5$CO, C$_6$H$_3$(NO$_2$)$_2$, CH$_3$C$_6$H(NO$_2$)$_3$, etc.

It is also to be understood that by the term derivative I do not intend to include salts formed from strong acids which in themselves are highly deleterious to the aging of rubber.

The nomenclature used to denote the position of the substituted chemical groups is the conventional system. The structure of the ethane molecule being considered to be as follows:

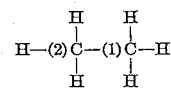

One class of material exhibiting the desired anti-oxidant effect as aforesaid may be designated as 1-2 diamino ethane, wherein one hydrogen atom of each amino group is replaced by an aromatic radical, and the other hydrogen atom may or may not be replaced by an organic radical. The chemical formula of one of these materials being as follows:

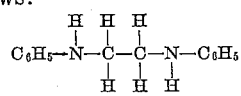

This material may be prepared by heating 1-2 dichlor ethane with an excess of aniline at a temperature of about 140° C. until reaction is complete, and is sometimes referred to as 1-2 dianilino ethane. The material is then extracted with hot water to dissolve out the aniline hydrochloride, which is a by-product in the reaction, and the residue of 1-2 di (phenyl amino) ethane is then allowed to solidify. It is filtered and dried and is then ready for use.

It is a white or light yellow solid having a melting point of approximately 65° C. and possessing practically no odor.

Other typical anti-oxidant agents belonging to this class are as follows:

1-2 di (ortho tolyl amino) ethane
1-2 di (para tolyl amino) ethane
1-2 di (xylyl amino) ethane
1-2 di (alpha naphthyl amino) ethane
1-2 di (beta naphthyl amino) ethane
1 (phenyl amino 2 ortho tolyl amino) ethane
1-2 di (ethyl ortho tolyl amino) ethane
1-2 di (benzyl phenyl amino) ethane
1-2 di (phenyl nitrosamino) ethane
1-2 di (ethyl phenyl amino) ethane
1-2 di (benzyl amino) ethane
1-2 di (butyl phenyl amino) ethane Typical rubber-like compounds, or mixtures, having one of the described anti-oxidant agents incorporated therein are as follows:

| Compound | B | C |
|---|---|---|
| Rubber | 55.30 | 55.30 |
| Zinc oxide | 16.50 | 16.50 |
| Sulphur | 2.25 | 2.25 |
| Mineral oil | 4.75 | 4.00 |
| Carbon black | 20 | 20 |
| Diphenyl guanidine | 0.45 | 0.45 |
| 1-2 di (phenyl amino) ethane | 0.75 | 1.50 |

These compounds were cured in a press for periods of thirty, sixty and ninety minutes at forty pounds steam pressure and tested, in connection with a like compound having the anti-oxidant agent omitted, which compound in the test was designated compound A, for aging qualities, both by the oxygen bomb test and by the hot oven methods, with results as follows:

*The oxygen bomb age test*

| Compound | Cure 30′ x 40# | | | | Cure 60′ x 40# | | | | Cure 90′ x 40# | | | |
|---|---|---|---|---|---|---|---|---|---|---|---|---|
| | Tensile | | E. at break | | Tensile | | E. at break | | Tensile | | E. at break | |
| | Original | Final | Original | Final | Original | Final | Original | Final | Original | Final | Original | Final |
| | | | Percent | Percent | | | Percent | Percent | | | Percent | Percent |
| A | 3495 | 1765 | 690 | 590 | 3090 | 1675 | 620 | 520 | 2800 | 1145 | 560 | 330 |
| B | 3520 | 2440 | 760 | 670 | 3700 | 2295 | 710 | 600 | 3635 | 2180 | 660 | 520 |
| C | 3595 | 2520 | 740 | 660 | 3580 | 2625 | 690 | 610 | 3395 | 2350 | 620 | 530 |

In the foregoing table the "original tensile" is the tensile strength in pounds per square inch of the sample before being aged and the "final tensile" is the tensile strength in pounds per square inch after the sample has been heated for 48 hours in an oxygen bomb at 60° C. with an oxygen pressure of 300 pounds per square inch.

The elongation at break is also given for the samples before and after this aging treatment.

An accelerated hot oven test was also made for the above compounds cured at 60′ x 40# and the results are as follows:

| Days in oven at 150° F. | Compound A | | Compound B | | Compound C | |
|---|---|---|---|---|---|---|
| | Tensile | Elongation | Tensile | Elongation | Tensile | Elongation |
| | | Pct. | | Pct. | | Pct. |
| Original | 3090 | 620 | 3700 | 700 | 3580 | 690 |
| 4 days | 2790 | 550 | 3030 | 630 | 3275 | 630 |
| 10 days | 2300 | 470 | 2910 | 600 | 3200 | 630 |
| 18 days | 1125 | 390 | 2540 | 540 | 2800 | 600 |

It is to be noted that both methods of accelerated aging show that the compounds containing 1-2 di (phenyl amino) ethane age in a much superior manner to the compound not containing this material.

To illustrate the use of 1-2 di (phenyl amino) ethane in a black compounded stock accelerated by ethylidene aniline, the following mixtures were prepared, the quantities being expressed in parts per hundred:

| Compound | A | B | C |
|---|---|---|---|
| Rubber | 55.3 | 55.3 | 55.3 |
| Zinc oxide | 16.3 | 16.3 | 16.3 |
| Sulphur | 2.25 | 2.25 | 2.25 |
| Mineral oil | 5 | 4.25 | 3.5 |
| Carbon black | 20 | 20 | 20 |
| Stearic acid | 0.5 | 0.5 | 0.5 |
| Ethylidene aniline | 0.65 | 0.65 | 0.65 |
| 1-2 di (phenyl amino) ethane | 0 | 0.75 | 1.5 |

Slabs were cured in a press for 40, 80 and 100 minutes at 40 lbs. steam pressure and tests strips were then cut out and tested for aging qualities by heating in an oxygen bomb for 48 hours at 60° C. and an oxygen pressure of 300 lbs. per square inch. The aging results are given below:

| Compound | Cure 40′ x 40# | | | | Cure 80′ x 40# | | | | Cure 100′ x 40# | | | |
|---|---|---|---|---|---|---|---|---|---|---|---|---|
| | Tensile | | Elongation | | Tensile | | Elongation | | Tensile | | Elongation | |
| | Original | Final | Original | Final | Original | Final | Original | Final | Original | Final | Original | Final |
| | | | Percent | Percent | | | Percent | Percent | | | Percent | Percent |
| A | 3145 | 2580 | 750 | 690 | 3140 | 2130 | 720 | 620 | 3145 | 1870 | 710 | 680 |
| B | 3440 | 2710 | 760 | 690 | 3480 | 2640 | 760 | 650 | 3380 | 2500 | 740 | 630 |
| C | 3640 | 2925 | 750 | 720 | 3715 | 2695 | 740 | 650 | 3495 | 2695 | 730 | 640 |

To illustrate the use of 1-2 di (alpha naphthyl amino) ethane as an age resister in a black compounded stock accelerated by diphenyl guanidine, the following mixtures were prepared, the quantities being expressed in parts per hundred:

| Compound | A | B |
|---|---|---|
| Rubber | 55.30 | 55.30 |
| Diphenyl guanidine | 0.40 | 0.40 |
| Sulphur | 2.25 | 2.25 |
| Stearic acid | 0.50 | 0.50 |
| Carbon black | 20 | 20 |
| Mineral oil | 5 | 3.50 |
| Zinc oxide | 16.55 | 16.55 |
| 1-2 di (alpha naphthyl amino) ethane | 0 | 1.50 |

Slabs were cured in a press for 20, 40, 50, 60, 70, 80, 90, and 100 minutes at 40 lbs., thereby giving a complete range of under and over-vulcanization. Test strips were then cut out and tested for aging qualities by heating in an oxygen bomb for 48 hours at 60° C. and an oxygen pressure of 300 lbs. per square inch. The aging results are given below:

| Cure | Stock A | | | | Stock B | | | |
|---|---|---|---|---|---|---|---|---|
| | Tensile | | Elongation | | Tensile | | Elongation | |
| | Original | Final | Original | Final | Original | Final | Original | Final |
| | | | Percent | Percent | | | Percent | Percent |
| 20′ x 40# | 2790 | 2255 | 790 | 720 | 2885 | 2695 | 750 | 680 |
| 40′ x 40# | 3410 | 2440 | 760 | 660 | 3575 | 3270 | 740 | 690 |
| 50′ x 40# | 3350 | 2430 | 740 | 600 | 3090 | 3075 | 700 | 680 |
| 60′ x 40# | 3770 | 2245 | 750 | 550 | 3480 | 3320 | 710 | 670 |
| 70′ x 40# | 3220 | 2225 | 750 | 540 | 3585 | 3365 | 690 | 640 |
| 80′ x 40# | 3430 | 2120 | 740 | 530 | 3600 | 3140 | 690 | 640 |
| 90′ x 40# | 3605 | 2185 | 750 | 550 | 3540 | 3010 | 680 | 560 |
| 100′ x 40# | 3390 | 1895 | 730 | 530 | 3320 | 2800 | 650 | 590 |

An accelerated hot oven test was made on the above stocks cured in a press for 50, 70 and 100 minutes at 40 lbs. steam pressure, and the results are given below:

*Compound A*

| Days in oven at 150° F. | Cure 50′ x 40# | | Cure 70′ x 40# | | Cure 100′ x 40# | |
|---|---|---|---|---|---|---|
| | Tensile | Elongation | Tensile | Elongation | Tensile | Elongation |
| | | Percent | | Percent | | Percent |
| Original | 3350 | 740 | 3220 | 750 | 3390 | 730 |
| 2 days | 3440 | 690 | 3555 | 670 | 3270 | 590 |
| 6 days | 3250 | 660 | 3140 | 570 | 3160 | 550 |
| 10 days | 2560 | 590 | 2610 | 530 | 2390 | 470 |
| 15 days | | | | | | |
| 20 days | 2075 | 550 | 1970 | 460 | 1740 | 350 |

*Compound B*

| Days in oven at 150° F. | Cure 50′ x 40# | | Cure 70′ x 40# | | Cure 100′ x 40# | |
|---|---|---|---|---|---|---|
| | Tensile | Elongation | Tensile | Elongation | Tensile | Elongation |
| | | Pct. | | Pct. | | Pct. |
| Original | 3090 | 700 | 3585 | 690 | 3320 | 650 |
| 2 days | 3655 | 690 | 3820 | 680 | 3500 | 630 |
| 6 days | 3575 | 690 | 3860 | 700 | 3460 | 620 |
| 10 days | 3310 | 680 | 3320 | 630 | 2965 | 540 |
| 15 days | 3200 | 680 | 3035 | 560 | 2735 | 490 |
| 20 days | 3300 | 660 | 3025 | 530 | 2705 | 460 |

The use of 1-2 di (ethyl phenyl amino) ethane ($C_6H_5C_2H_5N—CH_2CH_2N—C_2H_5C_6H_5$) is illustrated in this example:

| Compound | A | B |
|---|---|---|
| Rubber | 55.3 | 55.3 |
| Di phenyl guanidine | 0.25 | 0.25 |
| Carbon black | 20 | 20 |
| Stearic acid | 0.5 | 0.5 |
| Oil | 5 | 3.5 |
| Sulphur | 2.25 | 2.25 |
| Zinc oxide | 16.7 | 16.7 |
| 1-2 di (ethyl phenyl amino) ethane | | 1.5 |
| | 100.0 | 100.0 |

An accelerated age test was made on these stocks cured for 50, 70, and 90 minutes at 40 lbs. steam pressure, and the results are given in the table below:

*Compound A*

| Days in oven at 150° F. | Cure 50′ x 40# | | Cure 70′ x 40# | | Cure 90′ x 40# | |
|---|---|---|---|---|---|---|
| | Tensile | Elongation | Tensile | Elongation | Tensile | Elongation |
| | | Pct. | | Pct. | | Pct. |
| Original | 3500 | 720 | 3475 | 700 | 3320 | 690 |
| 3 days | 3680 | 670 | 3750 | 650 | 3560 | 650 |
| 5 days | 3375 | 640 | 3520 | 630 | 3220 | 590 |
| 10 days | 2930 | 640 | 2890 | 580 | 2620 | 500 |
| 17 days | 2585 | 600 | 2420 | 530 | 2300 | 450 |
| 24 days | 1810 | 520 | 1680 | 430 | 1515 | 360 |

*Compound B*

| Days in oven at 150° F. | Cure 50′ x 40# | | Cure 70′ x 40# | | Cure 90′ x 40# | |
|---|---|---|---|---|---|---|
| | Tensile | Elongation | Tensile | Elongation | Tensile | Elongation |
| | | Pct. | | Pct. | | Pct. |
| Original | 3545 | 730 | 3550 | 700 | 3260 | 670 |
| 3 days | 3980 | 700 | 3845 | 670 | 3760 | 640 |
| 5 days | 3725 | 680 | 3725 | 650 | 3360 | 610 |
| 10 days | 3335 | 680 | 3265 | 640 | 3100 | 600 |
| 17 days | 3185 | 620 | 3165 | 610 | 2960 | 520 |
| 24 days | 2615 | 590 | 2605 | 560 | 2520 | 510 |

To illustrate the use of 1-2 di (phenyl nitrosamino) ethane ($C_6H_5NONCH_2CH_2NNOC_6H_5$), the following stocks were compounded and mixed, the quantities being expressed in parts per hundred:

| Compound | A | B |
|---|---|---|
| Rubber | 55.3 | 55.3 |
| Di phenyl guanidine | 0.25 | 0.25 |
| Carbon black | 20 | 20 |
| Sulphur | 2.25 | 2.25 |
| Stearic acid | 0.5 | 0.5 |
| Oil | 5 | 3.5 |
| Zinc oxide | 16.7 | 16.7 |
| 1-2 di (phenyl nitrosamino) ethane | | 1.5 |
| | 100.00 | 100.00 |

An accelerated oven test was made on the above stocks cured for 50, 70 and 90 minutes at 40 lbs. steam pressure, and the results are given below:

*Compound A*

| Days in oven at 150° F. | Cure 50′ x 40# | | Cure 70′ x 40# | | Cure 90′ x 40# | |
|---|---|---|---|---|---|---|
| | Tensile | Elongation | Tensile | Elongation | Tensile | Elongation |
| | | Pct. | | Pct. | | Pct. |
| Original | 3500 | 720 | 3475 | 700 | 3320 | 690 |
| 3 days | 3680 | 660 | 3750 | 650 | 3560 | 650 |
| 5 days | 3375 | 650 | 3520 | 630 | 3220 | 590 |
| 10 days | 2930 | 640 | 2890 | 580 | 2620 | 500 |
| 17 days | 2585 | 600 | 2420 | 530 | 2300 | 450 |
| 24 days | 1810 | 520 | 1680 | 430 | 1515 | 360 |

*Compound B*

| Days in oven at 150° F. | Cure 50' x 40# | | Cure 70' x 40# | | Cure 90' x 40# | |
|---|---|---|---|---|---|---|
| | Tensile | Elongation | Tensile | Elongation | Tensile | Elongation |
| | | Pct. | | Pct. | | Pct. |
| Original | 3630 | 710 | 3510 | 680 | 3420 | 670 |
| 3 days | 3740 | 710 | 3880 | 680 | 3235 | 600 |
| 5 days | 3520 | 680 | 3600 | 650 | 3180 | 600 |
| 10 days | 3220 | 670 | 3215 | 630 | 2990 | 540 |
| 17 days | 3005 | 640 | 3265 | 610 | 2960 | 510 |
| 24 days | 2545 | 600 | 2615 | 520 | 2375 | 440 |

Another class of anti-oxidant agents contemplated by my invention may be typified by 1-2 di (phenyl amino)-2-methyl ethane, the formula for which is:

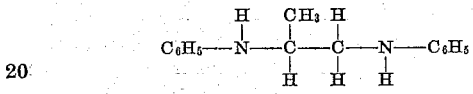

This material may be prepared by heating 1-2 dichlor-2-methyl ethane (1-2 dichlor propane) with aniline and is sometimes referred to as 1-2 dianilino 2-methyl ethane.

Some other derivatives of this class are:

1-2 di (ortho tolyl amino)-2-methyl ethane
1-2 di (para tolyl amino)-2-methyl ethane
1-2 di (xylyl amino)-2-methyl ethane
1-2 di (alpha naphthyl amino)-2-methyl ethane
1-2 di (beta naphthyl amino)-2-methyl ethane
1-2 (phenyl ortho tolyl diamino)-2-methyl ethane
1-2 di (ethyl phenyl amino)-2-methyl ethane
1-2 di (ethyl ortho tolyl amino)-2-methyl ethane
1-2 di (phenyl nitrosamino)-2-methyl ethane
1-2 (phenyl alpha naphthyl diamino)-2-methyl ethane
1-2 di (phenyl amino)-2-isopropyl ethane
1-2 di (phenyl amino)-2-pseudo butyl ethane
1-2 di (ethyl o-tolyl amino)-2-methyl ethane
1-2 di (phenyl amino)-2-ethyl ethane To illustrate the use of 1-2 di (phenyl amino)-2-methyl ethane in a pure gum stock accelerated by alpha ethyl beta propyl acryl aniline, the following rubber batches were compounded and mixed, the quantities being expressed in parts per hundred:

| Compound | A | B |
|---|---|---|
| Rubber | 90.5 | 89 |
| Zinc oxide | 5.1 | 5.1 |
| Sulphur | 4 | 4 |
| Alpha ethyl beta propyl acril aniline | 0.4 | 0.4 |
| 1-2 di (phenyl amino) 2 methyl ethane | 0 | 1.5 |

An accelerated hot oven test was made on the above stocks cured in a press for 40 and 50 minutes at 40 lbs. steam pressure. The results are as follows:

| Days in oven at 150° F. | Compound A | | | | Compound B | | | |
|---|---|---|---|---|---|---|---|---|
| | 40' x 40# | | 50' x 40# | | 40' x 40# | | 50' x 40# | |
| | Tensile | Elongation | Tensile | Elongation | Tensile | Elongation | Tensile | Elongation |
| | | Pct. | | Pct. | | Pct. | | Pct. |
| Original | 2860 | 740 | 3175 | 720 | 3035 | 700 | 3080 | 700 |
| 2 days | 3130 | 700 | 2975 | 710 | 3155 | 700 | 3005 | 690 |
| 5 days | 2915 | 650 | 2980 | 660 | 3040 | 670 | 3060 | 660 |
| 9 days | 3035 | 660 | 2885 | 640 | 3030 | 660 | 2930 | 640 |
| 18 days | 2300 | 610 | 1800 | 580 | 2730 | 620 | 2190 | 590 |
| 26 days | 1090 | 470 | 270 | 200 | 2335 | 570 | 2075 | 540 |

Another class of said agents may be typified by 1-2 di (phenyl amino)-1-2-dimethyl ethane, or 2-3-di (phenyl amino) butane, the chemical formula for which is:

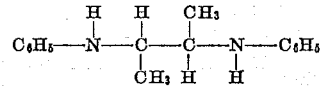

This material is also referred to as 1-2 di anilino 1-2 dimethyl ethane. It may be prepared by treating 1-2 dichlor 1-2 dimethyl ethane (2-3 dichlor butane) with aniline.

Other typical members of this class are:

1-2 di (ortho tolyl amino)-1-2-dimethyl ethane
1-2 di (para tolyl amino)-1-2-dimethyl ethane
1-2 di (alpha naphthyl amino)-1-2-dimethyl ethane
1-2 di (ortho tolyl amino)-2-ethyl ethane
1-2 di (phenyl amino)-2-2-dimethyl ethane
1-2 di (phenyl amino)-1-methyl-2-ethyl ethane
1-2 di (phenyl amino)-1-2 diphenyl ethane The use of 1-2 di (phenyl amino) 1-2 di methyl ethane as an age retarder in a tread stock accelerated by diphenyl guanidine is illustrated in this example. The following stocks are compounded and mixed, the quantities being expressed in parts per hundred:

| Compound | A | B |
|---|---|---|
| Rubber | 55.3 | 55.3 |
| Diphenyl guanidine | 0.4 | 0.4 |
| Sulphur | 2.25 | 2.25 |
| Stearic acid | 0.5 | 0.5 |
| Carbon black | 20 | 20 |
| Oil | 5 | 3.5 |
| Zinc oxide | 16.55 | 16.55 |
| 1-2 di (phenyl amino) 1-2 dimethyl ethane | | 1.5 |
| | 100.00 | 100.00 |

An accelerated age test was made on these stocks cured for periods of 40, 60, and 80 minutes at 40 pounds steam.

*Compound A*

| Days in oven at 150° F. | Cure 40' x 40# | | Cure 60' x 40# | | Cure 80' x 40# | |
|---|---|---|---|---|---|---|
| | Tensile | Elongation | Tensile | Elongation | Tensile | Elongation |
| | | Pct. | | Pct. | | Pct. |
| Original | 3660 | 710 | 3440 | 660 | 3455 | 650 |
| 3 days | 3275 | 630 | 3180 | 610 | 3030 | 570 |
| 5 days | 3260 | 620 | 3150 | 590 | 2940 | 540 |
| 10 days | 2695 | 610 | 2690 | 530 | 2435 | 470 |
| 17 days | 1810 | 540 | 1870 | 450 | 1690 | 400 |
| 21 days | 1765 | 520 | 1735 | 430 | 1455 | 330 |

*Compound B*

| Days in oven at 150° F. | Cure 40' x 40# | | Cure 60' x 40# | | Cure 80' x 40# | |
|---|---|---|---|---|---|---|
| | Tensile | Elongation | Tensile | Elongatioo | Tensile | Elongation |
| | | Pct. | | Pct. | | Pct. |
| Original | 3570 | 690 | 3340 | 650 | 3190 | 580 |
| 3 days | 3525 | 650 | 3150 | 570 | 3025 | 540 |
| 5 days | 3270 | 620 | 3240 | 580 | 3010 | 530 |
| 10 days | 3025 | 610 | 2930 | 550 | 2680 | 480 |
| 17 days | 2645 | 580 | 2850 | 520 | 2300 | 440 |
| 21 days | 2625 | 570 | 2800 | 520 | 2240 | 390 |

An oxygen bomb age test was made on the above stocks for a period of 48 hours at 60° C.

with an oxygen pressure of 300 lbs. per square inch.

| Compound | Cure 40' x 40# | | | | Cure 60' x 40# | | | | Cure 80' x 40# | | | |
|---|---|---|---|---|---|---|---|---|---|---|---|---|
| | Tensile | | E. at break | | Tensile | | E. at break | | Tensile | | E. at break | |
| | Original | Final | Original | Final | Original | Final | Original | Final | Original | Final | Original | Final |
| | | | Pct. | Pct. | | | Pct. | Pct. | | | Pct. | Pct. |
| A | 3660 | 2140 | 710 | 640 | 3440 | 2010 | 660 | 550 | 3455 | 1850 | 650 | 490 |
| B | 3570 | 2740 | 700 | 620 | 3340 | 2640 | 650 | 590 | 3190 | 2325 | 580 | 500 |

Another anti-oxidant agent within the purview of my invention is 1-2 di(phenyl amino)-1-2-2 trimethyl ethane, the formula for which is:

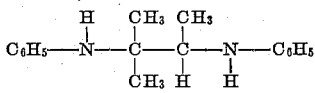

This material may be made by heating 1-2 dichlor 1-2-2 trimethyl ethane (2-3-dichlor-2-methyl butane) with aniline.

Other typical members of this class are:

1-2 di(o-tolylamino)-1-2-2 trimethyl ethane
1-2 di(alpha naphthyl amino)-1-2-2 trimethyl ethane Another class of agents within my invention is typified by 1-2 di(phenyl amino)-1-1-2-2-tetra methyl ethane, the formula for which is:

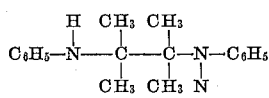

This material may be made by heating 1-2 dichlor 1-1-2-2 tetra methyl ethane, (2-3 dichlor 2-3 dimethyl butane) with aniline.

Other typical members of this class are:

1-2 di(ortho tolyl amino) 1-1-2-2-tetra methyl ethane
1-2 di(alpha naphthyl amino) 1-1-2-2-tetra methyl ethane While the materials cited above are the free bases, it is also possible to use certain salts of these materials without materially affecting the anti-oxidant value. In other words, the effect of protecting against deterioration, shown by the diamino ethane constitution, still holds true when this material is combined to form a salt.

In general, the most beneficial effect is obtained by using at least 1% to 1.5% of the antioxidant agent in the rubber compound and the durability of the goods is, up to a certain point, a function of the quantity of the material employed.

The addition of such a material to a rubber stock accelerated by any of the ordinary organic accelerators does not materially affect the rate of vulcanization of said rubber compound and for that reason may be introduced without materially disturbing the factory rate of cure.

It has also been found possible to add the material after the rubber stock has been vulcanized and still obtain appreciable improvement in the aging qualities of the stock. This may be done by painting or dipping the rubber stock with a solution of the desired material and after allowing penetration to take place, to dry off the surplus solvent.

It is, of course, possible that certain of the above materials might, in conjunction with certain accelerators, cause a more rapid cure to take place, but this cannot be foreseen, and one skilled in the art can readily choose the proper material for a given rubber mix.

In the appended claims, the expression "represent members of a group" is to be interpreted as equivalent to the expression hereinbefore employed, namely, "may be any of the following chemical groups".

What I claim is:

1. The method of preserving rubber and the like which comprises controlling the age resisting properties thereof by treating such rubber, rubber composition, or the like with an antioxidant of the following formula:

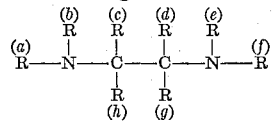

in which R(a), R(b), R(e) and R(f) represent members of a group consisting of hydrogen, nitroso, and hydrocarbon residues, and R(c), R(d), R(g) and R(h) represent members of a group consisting of hydrogen and hydrocarbon residues, at least one of the substituents attached to each nitrogen atom being aromatic in nature, the compound containing not more than two negatively substituted hydrocarbon residues, the compound being further characterized in that it contains no highly negative substituents, and that it possesses high anti-oxidant properties but exhibits substantially no accelerating action.

2. The method of preserving rubber and the like which comprises controlling the age resisting properties thereof by treating such rubber, rubber composition, or the like with an anti-oxidant of the following formula:

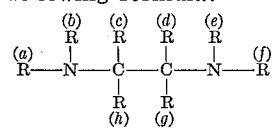

in which R(a), R(b), R(e) and R(f) represent members of a group consisting of hydrogen, nitroso, and hydrocarbon residues, at least one of the radicals attached to each nitrogen atom being aromatic in nature, and R(c), R(d), R(g) and R(h) represent members of a group consisting of hydrogen and hydrocarbon residues, the compound being characterized in that it possesses high anti-oxidant properties but exhibits substantially no accelerating action.

3. The method of preserving rubber which comprises controlling the age resisting properties thereof by treating such rubber with an antioxidant of the following formula:

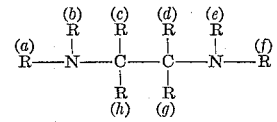

in which R(a), R(b), R(e) and R(f) represent members of a group consisting of hydrogen, nitroso, and hydrocarbon residues, at least one of the substituents attached to each nitrogen atom being other than hydrogen, and R(c), R(d), R(g)

and R(h) represent members of a group consisting of hydrogen and hydrocarbon residues, the compound containing not more than two negatively substituted hydrocarbon residues, the compound being further characterized in that it contains no highly negative substituents, and that it possesses high anti-oxidant properties but exhibits substantially no accelerating action.

4. The method of preserving rubber and the like which comprises controlling the age resisting properties thereof by treating such rubber, rubber composition, or the like with a diamino ethane in which at least one hydrogen atom of each amino group has been substituted by an aryl hydrocarbon residue, and in which not more than two negatively substituted hydrocarbon residues are present, no substituent being highly negative in character, the compound being further characterized by possessing high anti-oxidant properties but substantially no accelerating action.

5. The method of preserving rubber and the like which comprises controlling the age resisting properties thereof by treating such rubber, rubber composition, or the like with a 1-2 diamino ethane in which at least one of the basic hydrogen atoms attached to each nitrogen atom is substituted by an aryl hydrocarbon residue, the said diamino ethane being characterized by possessing high anti-oxidant properties but substantially no accelerating action.

6. The method of preserving rubber and the like which comprises controlling the age resisting properties thereof by treating such rubber, rubber composition, or the like with a 1-2 diamino ethane in which at least one of the basic hydrogen atoms attached to each nitrogen atom has been substituted by a phenyl group, the said diamino ethane being characterized by possessing high anti-oxidant properties but substantially no accelerating action.

7. The method of preserving rubber and the like which comprises controlling the age resisting properties thereof by treating such rubber, rubber composition, or the like with a N, N' diphenyl-substituted diamino ethane in which one or more of the ethylene hydrogen atoms is substituted by alkyl residues, the said diamino ethane being characterized by possessing high anti-oxidant properties but substantially no accelerating action.

8. The method of preserving rubber and the like which comprises controlling the age resisting properties thereof by treating such rubber, rubber composition, or the like with 1-2 di (phenyl amino) ethane in which one or more of the ethylene hydrogen atoms is substituted by alkyl groups.

9. The method of preserving rubber and the like which comprises controlling the age resisting properties thereof by treating such rubber, rubber composition, or the like with 1-2 di (phenyl amino) ethane.

10. The method of preserving rubber and the like which comprises controlling the age resisting properties thereof by treating such rubber, rubber composition, or the like with a N, N' di aryl substituted diamino ethane in which one or more of the ethylene hydrogen atoms is substituted by alkyl residues, the said diamino ethane being characterized by possessing high anti-oxidant properties but substantially no accelerating action.

11. An age resisting rubber or the like composition comprising rubber, rubber composition, or the like and 1-2 di (phenyl amino) ethane.

12. The method of claim 1 in which the compound contains at least one N-substituted monocyclic hydrocarbon residue.

13. The method of claim 1 in which the hydrocarbon residues attached to nitrogen are monocyclic aromatic hydrocarbon residues.

14. An age-resisting rubber and the like composition comprising rubber, rubber composition, or the like, and an anti-oxidant of the following formula:

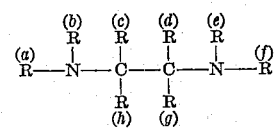

in which R(a), R(b), R(e), and R(f) represent members of a group consisting of hydrogen, nitroso, and hydrocarbon residues, and R(c), R(d), R(g), and R(h) represent members of a group consisting of hydrogen and hydrocarbon residues, at least one of the substituents attached to each nitrogen atom being aromatic in nature, the compound containing not more than two negatively substituted hydrocarbon residues, the compound being further characterized in that it contains no highly negative substituents, and that it possesses high anti-oxidant properties but exhibits substantially no accelerating action.

15. An age-resisting rubber and the like composition comprising rubber, rubber composition, or the like, and an anti-oxidant of the following formula:

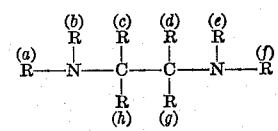

in which R(a), R(b), R(e), and R(f) represent members of a group consisting of hydrogen, nitroso, and hydrocarbon residues, and R(c), R(d), R(g), and R(h) represents members of a group consisting of hydrogen and hydrocarbon residues, at least one of the substituents attached to each nitrogen atom being other than hydrogen, the compound containing not more than two negatively substituted hydrocarbon residues, the compound being further characterized in that it contains no highly negative substituents, and that it possesses high anti-oxidant properties but exhibits substantially no accelerating action.

16. The method of preserving rubber and the like which comprises controlling the age-resisting properties thereof by treating such rubber, rubber composition, or the like, with 1-2 diamino ethane in which one or more of the ethylene hydrogen atoms is substituted by alkyl groups and in which at least one hydrogen atom of each amino group is substituted by an aromatic hydrocarbon residue.

17. An age-resisting rubber and the like composition comprising rubber, rubber composition, or the like, and 1-2 diamino ethane in which one of the hydrogen atoms attached to each nitrogen atom is substituted by a monocyclic aromatic residue.

18. An age-resisting rubber and the like composition comprising rubber, rubber composition, or the like, and 1-2 diamino ethane in which one of the hydrogen atoms attached to each nitrogen atom is substituted by a monocyclic aromatic residue and in which one or more of the ethylene hydrogen atoms is substituted by an alkyl group.

HAROLD A. MORTON.